United States Patent Office 3,277,530
Patented Oct. 11, 1966

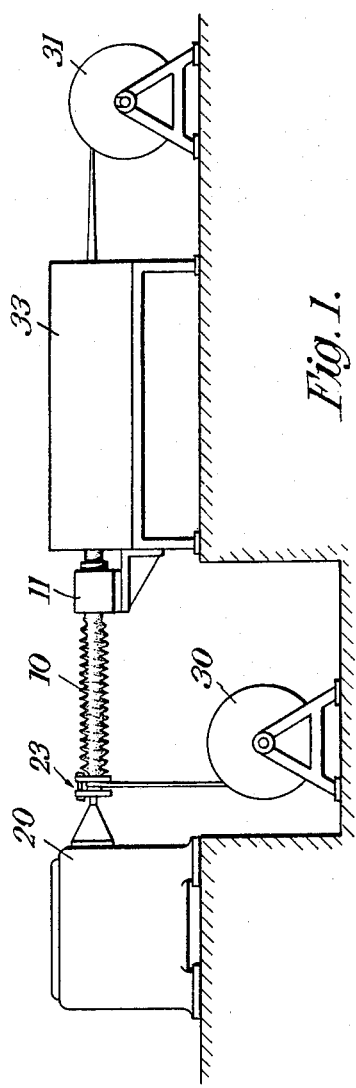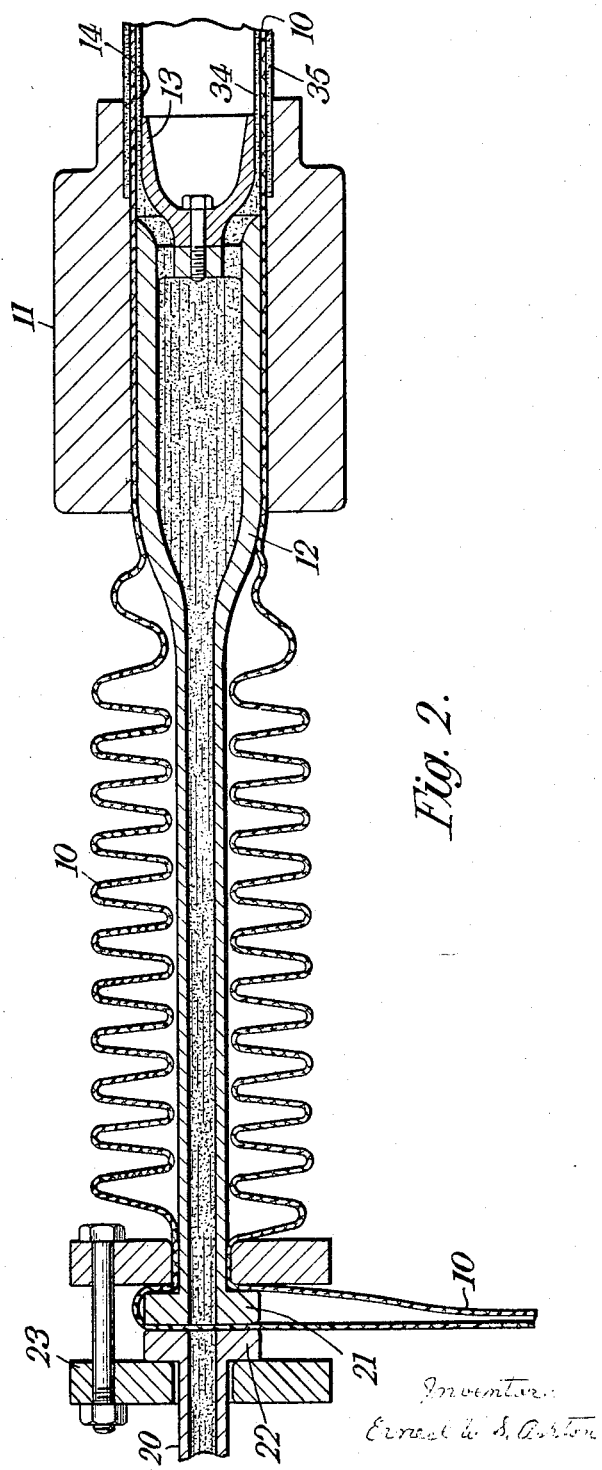

3,277,530
MACHINES FOR EXTRUDING TUBES
Ernest William Sheldon Ashton, Bentham, near Lancaster, England, assignor, by mesne assignments, to Societe Anonyme Plastus, Geneva, Switzerland, a corporation of Switzerland
Original application Aug. 1, 1963, Ser. No. 299,266, now Patent No. 3,191,230, dated June 29, 1965. Divided and this application Dec. 11, 1964, Ser. No. 417,641
Claims priority, application Great Britain, Aug. 9, 1962, 30,618/62
2 Claims. (Cl. 18—13)

This application is divided from my application Ser. No. 299,266, filed Aug. 1, 1963, now U.S. Patent No. 3,191,230, and is concerned with an improvement in the extrusion machine the subject of U.S. Patent No. 2,990,577.

The machine claimed in said patent is a machine for making impermeable tubes comprising a permeable reinforcing sleeve with an impermeable internal coating of synthetic resin or similar material, the machine comprising an extrusion head having a passage extending through it and terminating in an extrusion orifice, a mandrel within the passage, the mandrel being adapted to support the reinforcing sleeve and being provided along part of its length inside the passage with openings and terminating at its forward end in a portion of smaller cross-section, clamping means outside the head for locating the mandrel in position, means for drawing the sleeve under tension over the mandrel and through the passage and the extrusion orifice, and means for injecting synthetic resin or other coating material under pressure into the passage so that when the machine is in operation the synthetic resin or other coating material passes through the sleeve and into the openings of the mandrel and is extruded through the orifice as an internal coating on the reinforcing sleeve as the latter is pulled through the head, said internal coating having an internal section corresponding to that of the portion of the mandrel of smaller cross-section.

In use of said machine, the sleeve is provided with both an external coating and an internal coating of the synthetic resin, and since the synthetic resin is injected through the permeable sleeve in the extrusion head it follows of necessity that the external and internal coatings are of the same material.

An object is to provide a machine wherein coating material is intermittently injected into the interior of the mandrel through the clamping means for the mandrel.

One embodiment of the invention will now be described with reference to the accompanying drawing, wherein:

FIG. 1 is a diagrammatic side elevation of the machine and
FIG. 2 is a diagrammatic cross sectional view showing the extrusion head, the clamping means and the means for injecting coating material into the mandrel.

As shown in FIG. 1, a woven textile sleeve 10 is supplied from a reel 30 to an extrusion head 11, through which it is drawn by a wind-up drum 31. On its way from the extrusion head 11 to the drum 31 the lined sleeve passes through a cooling chamber 33.

As indicated in FIG. 2, the extrusion head 11 contains a hollow mandrel 12, having a reduced forward portion 13 which defines with the outer portion of the extrusion head an extrusion orifice 14. Polyvinyl chloride or other plastic material contained within the mandrel 12 is extruded, by passage through the orifice 14 to form an internal lining or coating 35 in the sleeve 10. The sleeve 10 is fed to the extrusion head 11 without an external coating, and plastic material will also be extruded through the sleeve within the extrusion head as in U.S. Patent No. 2,990,577 to De Laubarede, granted July 4, 1961, to form thereon an external coating 35.

If, however, the sleeve 11 has received an external coating of plastic material before reeling upon the reel 30, the plastic material will be extruded within the extrusion head 11 as an internal coating only. By providing the sleeve with a previous external coating of a plastic material different from that fed to the interior of the mandrel it is therefore possible to produce a tube having external and internal coatings of different materials.

The mandrel 12 is clamped externally of the extrusion head 11 and its rearwardly extending portion carries a flange 21 adjacent a flange 22 on an extruder for the plastic material. The plastic is injected intermittently from the outlet 20 of the extruder, which is axially aligned with the mandrel 12, into the interior of the mandrel. The apparatus operates intermittently. The sleeve 10 is drawn forwardly over the mandrel in corrugated form, as shown, while the clamping device 23 is relaxed. The clamping device 23 is then closed to lock the flanges 21, 22 together and the extruder is started to inject plastic through the mandrel into the extrusion head, the wind-up drum 31 also being started to draw the jacket through the extrusion head. When the reserve of sleeve represented by the corrugations is nearly exhausted, the machine is stopped, the clamping device 23 released and the above indicated procedure repeated.

What I claim as my invention and desire to secure by Letters Patent is:

1. A machine for making an impermeable tube comprising a permeable reinforcing sleeve having an impermeable internal coating of thermoplastic material, said machine comprising an extrusion head having a passage extending through it and terminating in an extrusion orifice, a hollow elongated mandrel having a portion extending into said passage, said mandrel being adapted to support the reinforcing sleeve and terminating at its forward end in a portion of smaller cross-section, clamping means external to the extrusion head which coact with the mandrel to locate it in position, means for drawing the sleeve under tension over the mandrel and through the passage and the extrusion orifice, and an extruder positioned adjacent said clamping means and operative to inject thermoplastic coating material intermittently into the interior of said mandrel and thence into said extrusion head, said thermoplastic material being extruded through said extrusion orifice to form an internal coating on said sleeve as said sleeve is drawn through the extrusion head.

2. A machine as claimed in claim 1, wherein said clamping means is constituted by flanges mounted respectively on the end of said mandrel and on said extruder and a device for clamping said flanges together, said extruder having an outlet which is axially aligned with said mandrel.

References Cited by the Examiner
UNITED STATES PATENTS

| 2,931,069 | 4/1960 | McCormick | 18—13 |
| 2,990,577 | 7/1961 | De Laubarede | 18—14 |
| 3,106,748 | 10/1963 | Skobel. | |
| 3,159,877 | 12/1964 | Orsini | 18—13 |

J. SPENCER OVERHOLSER, *Primary Examiner.*